Oct. 11, 1932.  M. STUPAR ET AL  1,882,305
CLAMP
Filed May 1, 1931

INVENTORS
MAX STUPAR. and
GEORGE A. PAGE JR.
BY ATTORNEY

Patented Oct. 11, 1932

1,882,305

UNITED STATES PATENT OFFICE

MAX STUPAR, OF BUFFALO, AND GEORGE A. PAGE, JR., OF FREEPORT, NEW YORK, ASSIGNORS TO CURTISS AEROPLANE & MOTOR COMPANY, INC., A CORPORATION OF NEW YORK

CLAMP

Application filed May 1, 1931. Serial No. 534,432.

This invention relates to a clamp for metallic members and to one which is especially adapted for use in connecting tubes and other elements used in aircraft construction.

Prior to our invention there has been generally used in the aircraft industry a type of clamp known as the Fokker clamp. The Fokker clamp is formed by welding to each end of a metallic strip a short tube, thereby forming eyes through which a bolt may be inserted to draw the two ends of the strip toward each other. The Fokker clamp serves very well for its purposes but is extremely expensive to make. Inasmuch as it must be welded, aluminum alloys are not absolutely satisfactory for use in the Fokker clamp.

One of the objects of our invention is to provide a clamp useful in aircraft structures which is economical to produce and yet is satisfactory for all purposes for which it might be desired.

A further object is to reduce the weight of clamps used in aircraft structure.

Further objects will be apparent from a reading of the subjoined specification and claims and from a consideration of the accompanying drawing.

In order to explain the invention more clearly, one embodiment thereof is shown in said drawing, in which.

Figure 1:
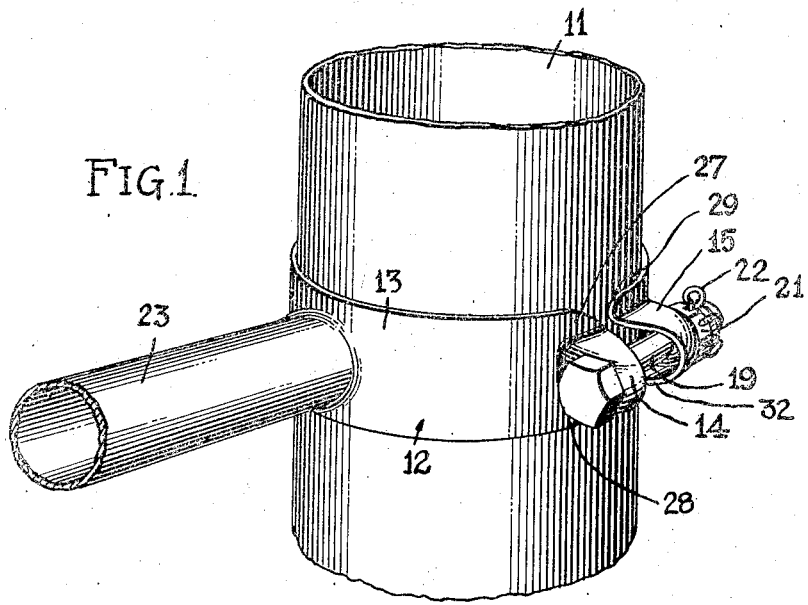
Fig. 1 is a perspective view of a clamp constructed according to my invention shown embracing a relatively large tube, the clamp being fastened tightly around said tube by a bolt.
Figure 2:
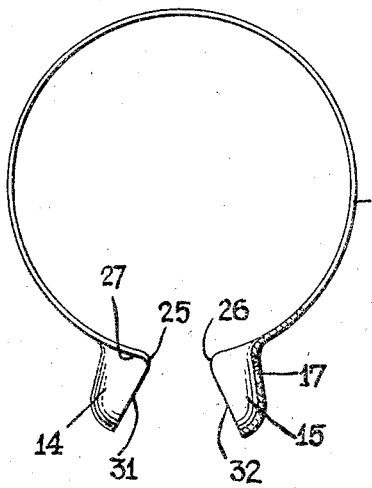
Fig. 2 is an end view of a clamp of slightly different construction separate from any structure to which it might be attached shown partly in section.
Figure 3:
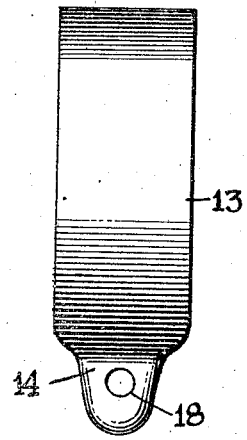
Fig. 3 is a side view of the clamp shown in Fig. 2.

Referring in detail to the drawing, we have shown in Figs. 1, 2 and 3 two clamps of slightly different design but have used the same reference numerals to designate similar elements. We have shown in Fig. 1 a relatively large tube 11 to which is attached a clamp constructed according to our improved design and generally designated 12. This clamp is formed of a strip 13 of suitable metal, preferably duralumin, the ends of which are die-pressed to form the cup-shaped projections 14 and 15. As may be seen more clearly in Figs. 2 and 3 the projections 14 and 15 are formed with holes such as the holes 17 and 18 through which a bolt such as the bolt 19 is adapted to be inserted. A castellated nut 21 is threaded upon the end of the bolt 19 and a cotter pin 22 is used to lock the nut.

Tubes and other elements may be secured to the clamp by welding if desired. In Figs. 2 and 3 are shown simple clamps without any other part welded thereto. In Fig. 1, however, there is shown a small tube 23 welded to the side of the strip 13 so that the tube 23 extends substantially at right angles to the strip 13. Otherwise the clamp shown in Fig. 1 is exactly the same as that shown in Figs. 2 and 3.

In the process of forming our improved clamp, a strip of metal is cut to the desired shape and length and the ends of the strip are die-pressed so as to form hollow projections of substantial thickness and of three-sided formation whereby the ends of the strips may be attached to each other. It is to be especially noted that the projections 14 and 15 are not simple right angled projections but are more or less cup-shaped and thereby applicant is enabled to obtain anchors of substantial strength. The holes 17 and 18 are punched through the ends of the strip after the projections have been formed. Any desired fitting, tube, bracing member or other structural member may be welded to the clamp as is the tube 23 in the illustration of Fig. 1. or the clamp may be used without having any other element welded thereto as is shown in Figs. 2 and 3.

As stated above, the projections 14 and 15 are cup-shaped. This formation of the ends is believed to be important. In the preferred form of our invention shown in Figs. 1, 2 and 3 but most clearly in Fig. 2 the inner faces 25 and 26 serve in effect as fulcrums of a lever. The adjacent faces 31 and 32 of the projections 14 and 15 slant outward away from each other. The bolt 19 serves to apply the force and the lever (being in effect a bell crank lever) moves the portions of the main strip 13 which are adjacent to the projections 25 and 26 away from the tube 11 and thus tightens the rest of the clamp around the tube. It may thus be seen that the construction of the invention involving as it does the cup-shaped end projection is entirely different in its action from the action of a mere strip fastened around a tube. The stresses involved in the action of a clamp designed according to this invention become largely compressive stresses rather than purely bending stresses. The two sides of the cups are pressed against each other and further tightening of the bolt acts in compression with these sides and retards the bending at the base of the projections.

Prior to the development of this improved form of clamp, we designed another form in which the ends were also formed with cup-shaped projections. The earlier form, however, differed from the form shown in Fig. 2 in that the ends thereof instead of slanting as shown at 31 and 32 of Fig. 2 slanted outward toward each other. By the construction of our earlier design, tightening of the clamp by means of a bolt brought the outer ends of the projections into contact with each other and further tightening of the clamps caused said outer ends to form the fulcrum of a lever in which the bolt served for the application of force and the main portion of the strap received the work done by the application of the force. While the earlier form of our invention enjoys some of the same advantages as the latter in that it uses cup-shaped projections and converts bending stresses into compression stresses, yet the form illustrated and claimed herein is believed to be much superior.

As may be clearly seen in Fig. 1 there are left on each side of the cup projections flat surfaces such as 27, 28 and 29 which contact with the tube to be embraced and thus minimize the danger of a sharp edge piercing the thin walls of the tube to be embraced.

The construction shown is very strong. It approximates the construction of the prior art clamps in strength, but hardly compares with them in cost, inasmuch as the cost of our improved clamp is only from 1/15 to 1/25 of the cost of the prior art clamps. It is adequately strong for the purposes desired, inasmuch as the threads will be stripped from the bolt before any part of the clamp fails.

A further advantage of our improved clamp is that if desired the holes 17 and 18 may be placed as shown so far inward that they bring the shank of the bolt adjacent to the tube to be embraced. Inasmuch as the moment at the pressed boss depends on the length of the lever arm between the points 25 and 26 and the bolt 19, this moment may thus be reduced to a minimum. This fact together with the ability to use duralumin alloys allows the production of a clamp of minimum weight.

It is to be understood that the above described embodiment of the invention is for the purpose of illustration only, and various changes may be made therein without departing from the spirit and scope of the invention.

We claim as our invention:

1. A clamp for aircraft use comprising a sheet metal band adapted to encircle a structural element of the aircraft; die-pressed substantially cup-shaped open sided projections formed upon said band, one each at opposite ends thereof, said projections being disposed with their open sides adjacent and having each an overall width substantially less than the width of said band at said ends; and means passing through said projections and bearing thereon for drawing the ends of said band together.

2. A clamp for aircraft use comprising a sheet metal band adapted to encircle a structural element of the aircraft, substantially cup-shaped open sided projections formed on and from said band, one each at opposite ends thereof, said projections being disposed with their open sides adjacent and each having an overall width substantially less than the width of said band at said ends, and means passing through said open sides and said projections and bearing thereon for drawing the ends of said band together.

3. A clamp for aircraft use including a flat bearing strip initially of equal width throughout its length, having formed on and from said strip toward the ends thereof projections, each said projection comprising a perforate portion substantially at right angles to said strip, bracket portions substantially normal to said perforate portion, extending toward and merging into the end of said strip, the junctures of said bracket portions with said strip of the two projections being substantially adjacent when said clamp is curved about a member of said aircraft, and means engaging said perforate portions for drawing the ends of said strip together, the overall width of said bracket portions being less than the width of said flat strip at the ends thereof.

In testimony whereof we hereunto affix our signatures.

MAX STUPAR.
GEORGE A. PAGE, Jr.